Aug. 25, 1953  G. B. CRANE  2,650,358
OSCILLATION NETWORK WITH CIRCUITS FOR DEVELOPING VOLTAGES IN
ACCORDANCE WITH ANGULAR POSITIONS OF RADIATED ANTENNA BEAMS
Filed Feb. 21, 1951  2 Sheets-Sheet 1

GEORGE B. CRANE,
INVENTOR.

BY Lyon & Lyon
ATTORNEYS

GEORGE B. CRANE,
INVENTOR.

BY Lyon & Lyon
ATTORNEYS

Patented Aug. 25, 1953

2,650,358

UNITED STATES PATENT OFFICE 2,650,358

OSCILLATION NETWORK WITH CIRCUITS FOR DEVELOPING VOLTAGES IN ACCORDANCE WITH ANGULAR POSITIONS OF RADIATED ANTENNA BEAMS

George B. Crane, Redondo Beach, Calif., assignor to Gilfillan Bros., Inc., Los Angeles, Calif., a corporation of California Application February 21, 1951, Serial No. 212,114

8 Claims. (Cl. 343—100)

The present invention relates to an improved system for developing an electrical quantity which varies in a predetermined relationship with respect to the direction in which an electromagnetic beam is radiated into space as, for example, when such beam scans through the space.

In radar systems which use cathode ray tubes for indicating the position of reflecting objects in space, as for example in P. P. I. (Plan Position Indicator), and particularly in the precision section of G. C. A. (ground controlled approach) aircraft landing systems, a display is presented on the face of the cathode ray tube which is representative of the area scanned by an associated antenna beam. For purposes of accuracy, a reliable coupling link must be provided which synchronizes the motion of the cathode ray beam sweeps with the angular movement of the antenna beam.

It is therefore an object of the present invention to provide an improved coupling arrangement of this character which serves to produce an electrical quantity for application to the beam deflecting circuits of a cathode ray tube, such electrical quantity varying in accurate predetermined relationship with respect to the particular position of the antenna beam.

A specific object of the present invention is to provide an improved system of this character in which the change in position of the antenna beam is accompanied by a change in amplitude of a high frequency voltage supplied from a high voltage source, such high voltage source being regulated to provide a substantially constant output voltage which is substantially independent of the position of the antenna beam.

Another specific object of the present invention is to provide an improved regulated system of this character which incorporates features allowing the same to be used to produce substantially linear variations in the aforementioned electrical quantity in those instances where the antenna beam is produced by a variable wave guide type of antenna which may be end fed in either direction with respect to either outward or inward projection of the radiated beam with respect to the end which is fed.

Another specific object of the present invention is to provide an improved voltage regulating system incorporated in a high frequency oscillator network.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
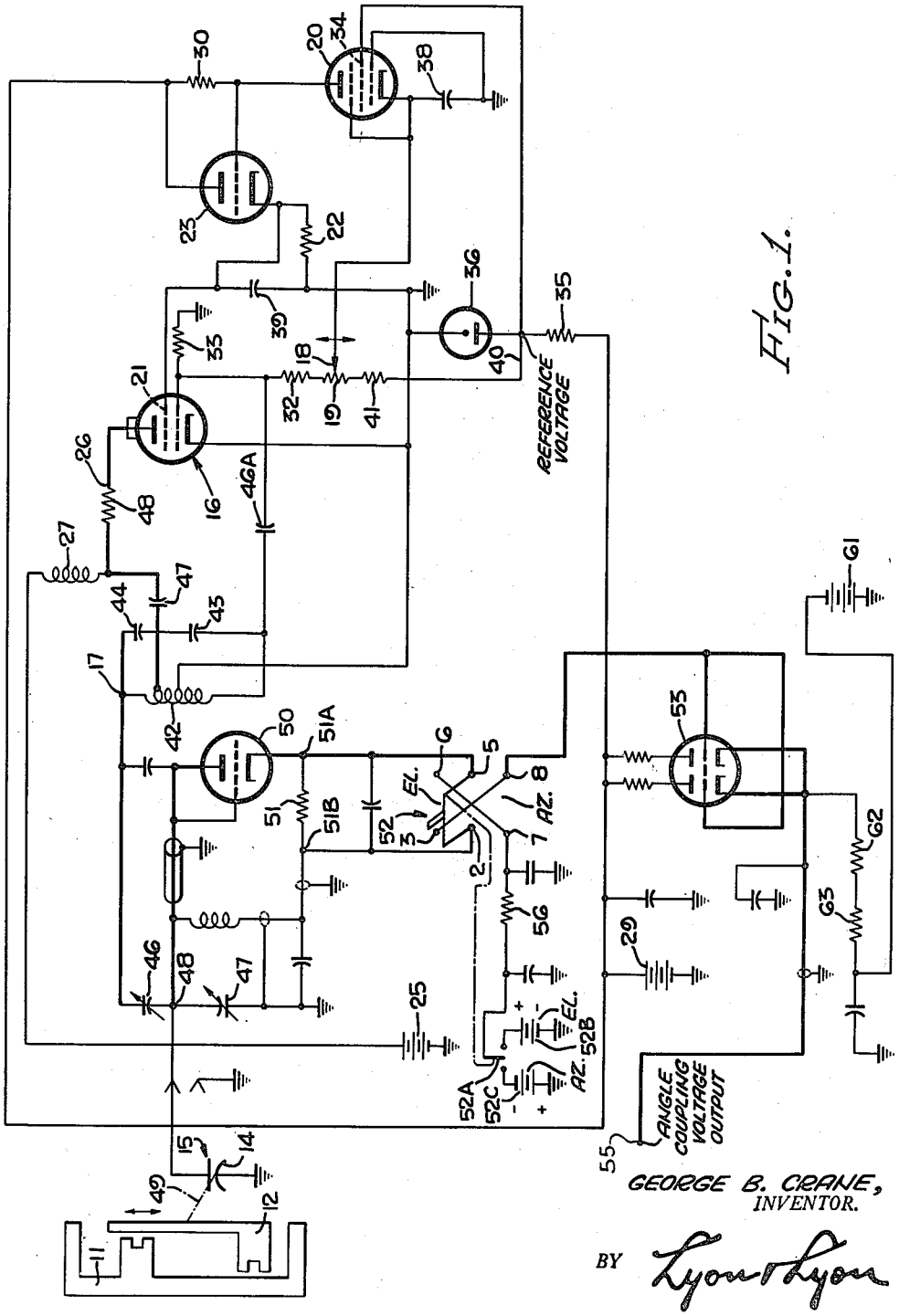
Figure 1 is a schematic representation of an improved system which embodies the present invention.
Figure 3:
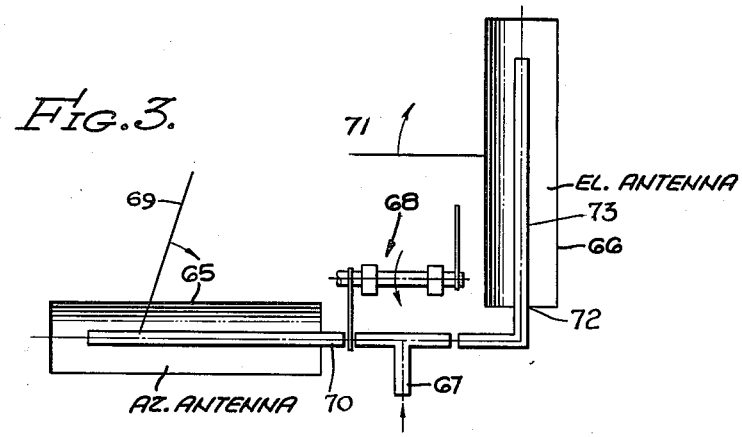
Figure 3 shows the manner in which energy is end fed into the two types of antenna with which the system shown in Figure 1 is associated.
Figure 2:
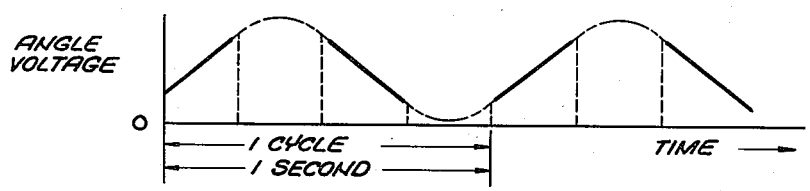
Figure 2 is a graphical representation illustrating the variation of voltage produced at the output terminals thereof in accordance with oscillatory movement of a movable wave guide element of the associated antenna.

In general, the system shown in Figure 1 functions to produce cyclically varying voltages represented by the voltage variation 10 in Figure 2 as a linear function of the position of the antenna beam radiated from the variable wave guide type of antenna which comprises the stationary guide member 11 and oscillatory guide member 12. For purposes of obtaining such voltage, such oscillatory guide member is mechanically coupled to the movable grounded plate 14 of the condenser 15, which is connected in a high frequency voltage dividing circuit as described presently. However, before such voltage dividing circuit is described with particularity, the oscillatory circuit which includes the tube 16 supplying high frequency voltage to such voltage dividing circuit is now described.

The oscillatory circuit including the tube 16 is a shunt-fed Hartley type oscillator operating class C, with the magnitude of the grid bias voltage developed between the control grid and cathode bearing a definite relationship to the output voltage appearing at the output terminal 17. Briefly, a fractional part of such grid bias voltage appearing at the movable tap 18 on the resistance 19 is first inverted and amplified in the grounded grid amplifier tube 20 and then applied to the screen grid 21 of the tube 16 from the load resistance 22 of the cathode follower stage 23, which is conductively coupled to the output circuit of the tube 20. By thus controlling the continuous potential of the screen grid 21, the output voltage appearing at the output terminal 17 is maintained substantially constant, by maintaining the grid bias voltage substantially constant by reason of the change in screen potential. It is understood, of course, that without such compensating or regulating circuit, the output voltage at the terminal 17 would increase when and as such grid bias voltage became more negative.

The tube 16 generates oscillations having a frequency in the order of one megacycle, and has its cathode grounded while its anode is connected for the flow of space current to the positive terminal of voltage source 25 through the resistance 26 and radio frequency choke coil 27. The screen grid 21, as indicated above, has its voltage automatically varied in accordance with changing conditions in the grid circuit of the tube 16, and is connected, for the flow of space current thereto, through the anode-cathode resistance of tube 23 to the positive terminal of voltage source 29. The tube 23 has its cathode returned to ground through the resistance 22, and such cathode is connected to the screen grid 21. The anode of tube 23 is connected to the positive terminal of source 29, and a resistance 30 is connected between the anode and control grid of tube 23, such resistance 30 serving as a path for the flow of space current to the anode of tube 20. The anode of tube 20 is connected to the control grid of tube 23, and it is observed that since the cathode of tube 20 is returned to ground through the serially connected resistances 19, 32 and 33, space current will flow through the tube 20 from the positive terminal of source 29. The control grid of tube 20 is grounded, and its screen grid 34 is connected to the positive terminal of source 29 through resistance 35, one terminal of which is connected to the voltage regulator tube 36, which, incidentally, serves to maintain the potential on the screen grid 34 substantially constant. Tube 20 has its cathode bypassed to ground by means of bypass condenser 38, and similarly, the cathode of tube 23 is bypassed to ground through the condenser 39.

It is observed that the junction point of regulator tube 36, which is connected to the lead 40, as indicated previously, is of fixed potential and is returned to ground through a voltage dividing circuit, such circuit including the serially connected resistances 41, 19, 32 and 33. By this means the potential of the cathode of tube 20 may be adjusted at a predetermined magnitude by adjustment of the position of the movable tap 18 on resistance 19, to establish the operating point of tube 20.

As mentioned previously, the tube 16 is a shuntfed Hartley oscillator, the high frequency feedback circuits of which are described presently. The cathode of tube 16 is connected to an intermediate tap on the coil 42 of the tank circuit comprising coil 42 and serially connected condensers 43, 44. One outside terminal of coil 42 is connected to the control grid of tube 16 through condenser 46A, the second tap on coil 42 is connected to the anode of tube 16 through condenser 47 and resistance 48, while the other outside terminal of the coil 42 comprises the output terminal 17 which is at a relatively high voltage with respect to ground.

As indicated previously, this high frequency output voltage appearing at the terminal 17 is critical with respect to accurate operation of the system and is applied to a high frequency voltage dividing circuit, which includes the condenser 46 which is serially connected at terminal 48 with the shunt connected condensers 15 and 47. It is obvious that the potential at terminal 48 varies in accordance with variation of the condenser plate 14, which follows the movement of the oscillatory guide member 12, since these elements 12 and 14 are interconnected through a mechanical linkage which is indicated by the line 49.

In general, this varying high frequency voltage appearing at terminal 48 is peak detected in the peak detecting rectifying tube 50, to thereby provide a rectified potential across resistance 51. Such voltage appearing across resistance 51, of course, varies in accordance with movement of the condenser plate 14, and is applied through the switch 52, described in detail hereinafter, to the control grid of the cathode follower tube 53, with the resulting continuous varying potential at the cathode of tube 53 thus supplying the desired angle coupling voltage to the output terminal 55, such angle coupling voltage varying as indicated in Figure 2.

The general purpose of the two-position switch 52 and single pole double throw switch 52A is to allow the circuitry described herein to be used in connection either with the elevation or the azimuth antenna, as desired, in the precision section of a ground controlled approach (G. C. A.) radar system wherein the two antennas have different characteristics resulting from the manner in which high frequency energy is fed to the same with respect to the direction in which the radiated beams are projected. The differences in the antennas and circuit provided herein for compensating for such differences includes the switches 52, 52A and voltage sources 52B, 52C. The switches 52 and 52A are ganged as shown. The switch 52 is essentially a two pole double throw switch and is fixed in either one of its two positions, i. e., the elevation position or the azimuth position, depending upon whether the elements 11, 12 are elements of the elevation antenna or azimuth antenna, respectively. Assuming the elements 11, 12 are elements of the elevation antenna, then the switch terminals 2,5 of switch 52 are connected respectively to the switch terminals 3, 6 and terminal 6 is connected to the positive terminal of source 52B. In such case it is observed that the cathode of tube 50 and one terminal of resistance 51, i. e., the terminal 51A, are connected through the terminals 5, 6 and 7 and resistance 56 to the positive terminal of source 52B. At the same time, the other terminal of resistance 51, i. e., the terminal 51B, is connected through switch contacts 2, 3 and 8 to the control grid of the cathode follower tube 53, with the result that in such case the variations in angle coupling voltage appearing at output terminal 55 follow the variations in voltage appearing at the other terminal of resistance 51, such other terminal having the reference numeral 51B. Conversely, when the switches 52 and 52A are in their azimuth positions, corresponding to the condition wherein the wave guide elements 11, 12 are elements of the azimuth antenna, it will be observed that in such case the voltage variations appearing at the output terminal 55 follow those appearing at the terminal 51A. Thus, in this latter instance, the terminal 51A is connected through switch contacts 5 and 8 to the control grid of the cathode follower tube 53, and the other resistance terminal 51B is connected through switch contacts 2 and 7 to the negative terminal of voltage source 52C through resistance 56.

Space current to the cathode follower tube 53 is supplied from the positive terminal of voltage source 29, it being noted that the cathode of the follower tube 53 is returned to the negative terminal of voltage source 61 through the serially connected resistances 62, 63.

The azimuth antenna 65 and elevation antenna 66, in the G. C. A. system are alternately supplied with radio frequency energy from a wave guide having a T-section 67, such energy to the antennas 65 and 66 being alternately supplied by the rotating motor driven energy intercepting switch 68.

Figure 4:
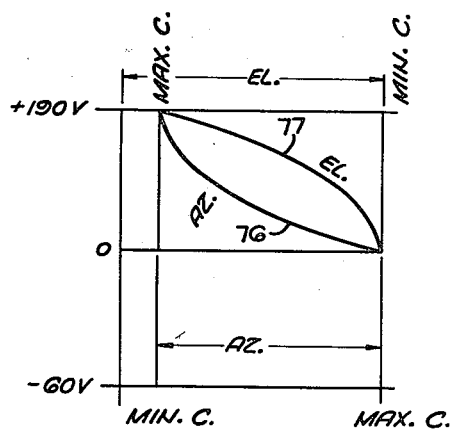
Figure 4 is a graphical representation for purposes of illustrating the variations in voltage developed in the system, for purposes of compensating for the manner in which energy is fed into either one of the antennas with which the system shown in Figure 1 is connected.

It is observed that in systems of this character the direction of the azimuth antenna beam 69 is towards the end 70 at which the azimuth wave guide 74 is fed with energy, whereas the elevation antenna beam 71 is scanned in the direction from the end 72 at which the wave guide 73 is fed. Because of these differences in antenna beam movement with respect to the ends at which the associated wave guides are fed, different types of voltage variations are supplied to the control grid of the cathode follower tube 53. These voltage variations are produced by the means described above and follow the variations shown in Figure 4.

To understand the nature of these variations, it should be observed first that in the "elevation" position of switch 52 the cathode of the peak detector 59 is operated at a potential above ground substantially equal to the potential of the source 52B, which is 190 volts, whereas in the "azimuth" position of the switch 52, this voltage is applied to the anode of the peak detector stage 50. It should also be observed that the relationship between displacement of the movable guide member 12 with respect to the angular position of the radiated antenna beam is nonlinear and varies generally as a power function. Furthermore, the relationship between movement of the condenser plate 14 and voltage across the terminals of condenser 15 is nonlinear and, as a matter of fact, is hyperbolic in nature. A curve matching problem exists, inasmuch as it is desired that the angle coupling voltages appearing at the output terminal 55 vary substantially linearly with the direction of radiated antenna beam. In arriving at this result, the condenser 46 is made adjustable to adjust the degree of curvature of the voltage characteristic appearing across condenser 15, and the condenser 47 is used generally to adjust the amplitude of such voltage characteristic, while the switching arrangement comprising the switch 52, which is a reversing switch, is used to reverse the curvature of this voltage characteristic, to thereby provide an opposite curvature to compensate for opposite curvature in the relationship between antenna beam displacement and wave guide movement.

In other words, as indicated above, when the antenna beam works "toward" the end at which the antenna wave guide is fed with energy, the relationship between antenna beam angle and wave guide element displacement has a definite curvature which is opposite to that which exists when the antenna beam works in the opposite direction with respect to the end of the wave guide at which it is fed. This condition, as noted above, exists in connection with the azimuth and elevation antennas in the G. C. A. system, and for that reason the curves 76, 77 each have opposite curvatures.

Inasmuch as the loading on the oscillator varies cyclically in accordance with cyclical variations in condenser 15, the output voltage appearing on lead 17 tends to change likewise; but, the novel regulating circuit provided herein produces a compensatory effect which overcomes this tendency to change, the regulating circuit being quick enough in its action to resist such changes, besides producing compensatory effects for changes in temperature and humidity in the environment surrounding the tank circuit.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In an arrangement of the character described, wherein it is desired to provide voltages which vary substantially linearly with the angle scanned by an antenna beam, means for cyclically moving said antenna beam, an electrical circuit having a movable variable element thereof coupled to said means, a source of high frequency oscillations, means coupling said source to said electrical circuit, and means coupled to said source regulating the amplitude of the oscillations generated in said source to render said amplitude substantially independent of cyclical variations in said variable element.

2. In an arrangement of the character described, wherein it is desired to provide voltages which vary substantially linearly with the angle scanned by an antenna beam, means for cyclically moving said antenna beam, a variable capacitor having a movable variable element thereof coupled to said means, a source of high frequency oscillations, an output circuit for said source, said output circuit comprising said variable condenser serially connected with a second condenser, and means coupled to said source regulating the amplitude of the oscillations generated in said source to render said amplitude substantially independent of cyclical variations in said variable capacitor.

3. In an arrangement of the character described, wherein it is desired to provide voltages which vary substantially linearly with the angle scanned by an antenna beam, means for cyclically moving said antenna beam, a variable capacitor having a movable variable element thereof coupled to said means, a source of high frequency oscillations, means coupling said variable condenser to said source, and means coupled to said source regulating the amplitude of the oscillations generated in said source to render said amplitude substantially independent of cyclical variations in said variable capacitor.

4. In an arrangement of the character described, wherein it is desired to provide voltages which vary substantially linearly with the angle scanned by an antenna beam, means for cyclically moving said antenna beam, a variable capacitor having a movable variable element thereof coupled to said means, a source of high frequency oscillations, an output circuit for said source, said output circuit comprising said variable condenser serially connected with a second condenser, means coupled to said source regulating the amplitude of the oscillations generated in said source to render said amplitude substantially independent of cyclical variations in said variable capacitor, and means including a peak detector coupled to said variable condenser and functioning to derive a unidirectional control voltage representation of the voltage appearing across said capacitor.

5. The arrangement set forth in claim 4 in which said peak detector has adjustable means associated therewith whereby the curvature of the graph representing variation of unidirectional control voltage with respect to voltage appearing across said condenser may be reversed.

6. In a system of the character described, an oscillatory circuit including an electron tube with a control grid developing a unidirectional voltage between said control grid and associated cathode which varies in accordance with the amplitude of the oscillatory output voltage of said circuit, said tube including an electrode, means deriving a substantially constant reference voltage source, resistance means connecting said source to said control grid, and means coupled to said source controlling the potential of said electrode in accordance with the potential of an intermediate point on said resistance means.

7. In a system of the character described, an oscillatory circuit including an electron tube with a control grid developing a unidirectional voltage between said control grid and associated cathode which varies in accordance with the amplitude of the oscillatory output voltage of said circuit, means for cyclicallly scanning an antenna beam, an electrical circuit having a movable variable element thereof coupled to said means, a source of high frequency oscillations, means coupling said oscillatory circuit to said electrical circuit, means coupled to the aforementioned source regulating the amplitude of the oscillations generated by said oscillatory circuit to render said amplitude substantially independent of cyclical variations in said variable element, said regulating means including a source of substantially constant unidirectional potential, an electrode of said tube, resistance means connecting said source to said control grid, and means coupled to said source of unidirectional potential controlling the potential of said electrode in accordance with the potential of an intermediate point on said resistance means.

8. The arrangement set forth in claim 7 in which said variable element comprises a condenser coupled to said oscillatory circuit, a peak detector coupled to said condenser to derive a unidirectional control voltage representation of the voltage appearing across said capacitor, and means associated with said peak detector whereby the curvature of the graph representing variation of unidirectional control voltage with respect to voltage appearing across said condenser may be reversed.

GEORGE B. CRANE.

References Cited in the file of this patent
UNITED STATES PATENTS

| Number | Name | Date |
|---|---|---|
| 2,194,548 | Hammond | Mar. 26, 1940 |
| 2,442,695 | Koch | June 1, 1948 |
| 2,509,230 | Himmel | May 30, 1950 |